Patented July 24, 1934

1,967,351

UNITED STATES PATENT OFFICE

1,967,351

HORMONE AND PROCESS OF OBTAINING THE SAME

Edward A. Doisy, Webster Groves, Mo., assignor to President and Board of Trustees of St. Louis University, St. Louis, Mo.

No Drawing. Application October 6, 1930, Serial No. 486,875

10 Claims. (Cl. 167—74)

The invention relates to the isolation of certain crystalline compounds characterized by their unique action upon the female genitalia.

The primary object of my invention is to provide a process for preparing these compounds and obtaining the same in a highly purified state so that they are particularly adapted for use as therapeutic agents in the treatment of ovarian dysfunctions.

Another object is to prepare products containing the hormones in concentrated form sufficiently free from impurities normally associated therewith in the natural products from which they are derived to permit administration to humans without substantial side reactions.

A further object is to separate certain closely related hormones and obtain same in pure crystalline form.

I have discovered that there are two separate and distinct substances of the ovarian hormone type having the physiological characteristic of promoting the growth of the uterus, vagina and the mammary glands. I have succeeded in isolating both of these substances and obtaining the same in the form of pure crystalline compounds substantially free from impurities.

For convenience in referring to these substances in the subsequent description I have designated the two compounds as the alpha hormone and the beta hormone. The physiological characteristics of the alpha hormone are such that I believe it to be the ovarian follicular hormone.

The most practical source for both the alpha and the beta hormones is the urine of pregnant animals, or of humans, in which they both occur. Placentae and amniotic fluid may also be utilized under certain conditions but so far have proved to be less satisfactory sources. My invention involves the separation of the two hormones, both of which may be obtained in pure crystalline form from the same portion of urine.

The physiological effects of the alpha hormone consist in the promotion of the growth of the uterus, vagina and mammary glands. The hormone, even when administered to ovariectomized animals, can restore full growth of the genital tract and call forth the sexual manifestations characteristic of estrus. Based upon this physiological effect, a quantitative evaluation of the hormone may be obtained and in the following discussion the potency of the product is expressed in terms of rat units.

A rat unit is defined as the minimal total amount of hormone necessary to induce estrus with complete cornification, as judged by the smear method, in an ovariectomized sexually mature rat weighing 140 (plus or minus 20) grams. For physiological reasons three injections are given at intervals of four hours. Normally, many rats are used in each assay and twenty rats are used with each dilution. The minimum volume with which a positive response is obtained in 75% of the animals is taken as containing one unit.

According to my invention I have obtained the alpha hormone in such a state of purity that a single milligram corresponds to approximately 3000 to 4000 rat units. This product is substantially free from impurities and is probably the isolated ovarian follicular hormone itself. Because of its purity the new product may be administered in adequate dosage as desired and all side reactions are avoided because of the freedom from foreign by-products.

The beta hormone appears to be closely related to the alpha hormone but differs physiologically therefrom primarily in possessing a slower acting but longer sustained effect in promoting the growth of the uterus, vagina and possibly of the mammary glands. Therapeutically, the beta hormone is probably of even greater practical importance since it need be administered less frequently to secure the desired physiological reaction.

The beta hormone is standardized by a method similar to that set forth above in connection with the alpha hormone with proper allowance for the slower but more prolonged reaction of the beta hormone.

While my products may be derived from various sources, I have found that the most practical and economical material for the preparation is the urine of pregnant animals or of humans. Although it is found that the concentration of the hormones increases as pregnancy progresses, the hormones are present in sufficient amounts throughout this period so that no special selection of urine is required.

Both the alpha hormone and the beta hormone may be extracted simultaneously from a given intermediate, such as the urine of pregnant animals, by means of suitable organic solvents such as are referred to below. Purification and isolation of the alpha hormone is based upon the fact that it possesses a sufficient acidic or salt-forming property so that it can be removed from certain organic solvents by means of alkali, and that it can be removed in turn from such alkaline solutions by successive extractions with immiscible organic solvents. Its purification is based upon such a reversible distribution between solvents. The separation of the beta hormone is dependent upon the fact that it undergoes less readily such a reversible distribution since it is less soluble in organic solvents and apparently it is also more acidic in character, and therefore it accumulates in the aqueous alkaline by-products.

A practical method for isolating both hormones from the urine of pregnant women is shown in the following diagram:

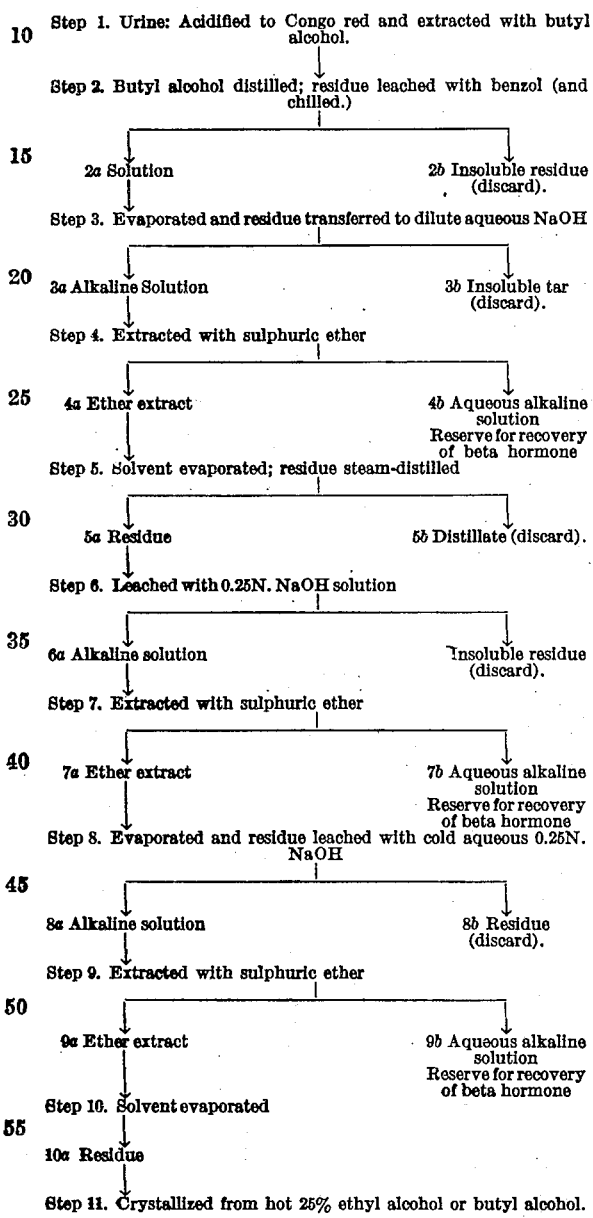

The following is a more detailed description of the steps of the process outlined in the above diagram:

Step 1. A 100 liter quantity of urine is acidified and subjected to repeated extraction with a suitable solvent such as butyl alcohol, benzol, chloroform or sulphuric ether. The use of n-butyl alcohol is preferred but is not essential.

Step 2. The butyl alcohol extract is concentrated to a small volume and is then distilled to dryness in vacuum and the brown tarry residue weighing usually 300-600 grams is extracted with three successive volumes of 1.5, 1.0, and 0.75 liters of hot benzol, which treatment extracts the active principles. The residue is discarded.

Step 3. The benzol extract is chilled, poured from tarry matter which separates, and distilled using a vacuum to complete the removal of the benzol. The residue from the distillation is treated with 200 cc. of warm butyl alcohol to which solution or suspension 4 liters of petroleum ether (60°-80° C) are added. The resultant solution and suspension is then extracted, first with 2400 cc. of 0.5 N alkali (NaOH solution) and subsequently with three portions of 1200 cc. each of 0.2 N alkali. These alkaline extracts are combined.

Step 4. The combined alkaline extracts are chilled and allowed to stand overnight to permit the separation of a small quantity of tarry material. The decanted solution is then partly neutralized with hydrochloric acid but the final reaction is maintained strongly alkaline to phenol phthalein. The volume of the solution at this stage is about 6000 cc.

The solution is now extracted with 1500 cc. of peroxide-free sulphuric ether, separated, and the ether extraction repeated five times. The combined ether extract is designated as (4a) in the chart and the aqueous alkaline layer as (4b). Both solutions are saved.

Step 5. The combined ether extracts are washed once with 500 cc. of 2% sodium bicarbonate, once with 500 cc. of 0.1 N HCl and once with distilled water, these washings being saved for recovery purposes. The ether is evaporated and the residue remaining is subjected to steam distillation until no more volatile matter is removable.

Step 6. The non-volatile oily product from Step 5 is leached with 500 cc. portions of warm 0.25 N alkali (NaOH solution) five times. The leachings are combined and the insoluble residue is discarded.

Step 7. The combined alkaline solution from Step 6 is half neutralized with hydrochloric acid and is extracted with 600 cc. portions of peroxide-free sulphuric ether, separated, and the ether extraction repeated five times. This operation yields fractions (7a) and (7b), the former containing the bulk of the alpha hormone. The latter fraction is reserved for recovery of the beta. The combined ether extracts are washed as directed in Step 5.

Step 8. The ether solution from Step 7 is subjected to distillation and the oily residue is leached with 300 cc. portions of cold 0.25 N alkali five times. The combined alkaline leachings are decanted from solid material and filtered through a sintered glass filter. This solution should possess only a pale yellow color and be perfectly clear.

Step 9. The combined alkaline solution from Step 8 is extracted six times with 400 cc. portions of sulphuric ether and the ether extract washed as directed in Step 5, using, however, smaller volumes of solutions. It will be noted that the volume of the solutions is progressively decreased and that, in general, the volume of sulphuric ether used for each extraction is one-fourth that of the alkaline solution to be extracted. Fraction 9b is reserved for recovery of the beta hormone.

Steps 10 and 11. The combined ether solution (fraction 9a) is subjected to distillation and the residue is dissolved in a small volume of hot 95% ethyl alcohol. Upon cooling the alpha fraction separates in a semi-crystalline mass which may be filtered off. A further quantity of crystalline material is obtained by adding 3 volumes of warm water to the alcohol solution and chilling. The product may be recrystallized from 25% aqueous ethyl alcohol or from 25% aqueous acetone or from benzol, ethyl acetate, petroleum ether or mixtures of solvents. For instance, the crystals may be dissolved in a small volume of butyl alcohol and induced to crystallize by the addition of petroleum ether.

In the preceding detailed description of the steps of the process I have outlined the preferred procedure suggesting the use of specific reagents and approximate concentrations and proportions. It is to be understood, however, that my invention is not necessarily limited to the exact details of this process but that in place of the reagents above set forth other chemical equivalents may be subtituted. Similarly the concentrations and proportions may be varied within wide limits.

The principal feature of the process resides in the discovery that the two hormones may be extracted in a common solution and may be separated by a process of reversible distribution, utilizing on the one hand an aqueous alkaline medium and on the other hand certain immiscible organic solvents. It is to be unders'ood that many organic solvents might be selected for this purpose but as specific examples I will enumerate certain preferred reagents such as sulphuric ether, petroleum ether, benzol, chloroform butyl alcohol and their chemical equivalents.

The alpha hormone obtained from Steps 10 and 11 in the above process consists of colorless crystals which, when crystallized from dilute alcohol, possess a distinct rhomboid outline. Larger crystals may possess a six sided tabular development. For identification purposes the following crystallographic data is of value:

System-monoclinic, indices of refraction $\alpha = 1.520$, $\beta - 1.642$, $\gamma = 1.692$, $2V = 55°$, tabular development on 010, pronounced basal cleavage nearly perpendicular to Bxa.

The crystals melt at 242–243° C. (248–249° C. corrected) with some decomposition.

The most characteristic property of this crystalline substance is its physiological behavior since it produces the characteristic effects upon the genital system as already outlined. A biological assay of the crystals shows that one milligram is equivalent to 3000–4000 rat units.

The purity of this product is shown by the fact that it may be, and has been, crystallized successively nineteen times using various organic solvents, but without diminution of its physiological effect.

*Isolation of the beta hormone*

The aqueous alkaline solutions designated as 4b, 7b, and 9b in the above diagram contain the beta hormone. These solutions are separately acidified with hydrochloric acid. At times, and particularly when the fractions 7b and 9b are acidified, a crystalline precipitate is obtained. This may be filtered off and crystallized directly from strong (95%) ethyl alcohol, butyl alcohol, mixtures of butyl alcohol with petroleum ether, or analogous organic solvents.

From cruder liquors such as fraction 4b an oily precipitate is obtained and this may be contaminated also with crystals of salicylic, hippuric, and similar acids. To purify such products the precipitate is extracted with an immiscible solvent such as sulphuric ether or petroleum ether, and washed with aqueous sodium bicarbonate solution so as to remove these foreign acids. The active substance is then retransferred to aqueous solution by repeated extraction with 0.25 N sodium hydroxide solution. This aqueous solution is washed with sulphuric ether to remove additional traces of alpha hormone.

The aqueous alkaline solution is then acidified and may yield a crop of crystals. If the precipitate is still oily in nature it is dissolved in butyl alcohol and treated with petroleum ether in order to precipitate a crop of the crystalline product.

The final product consists of colorless needle crystals. The crude once-recrystallized precipitate may melt at 276–278° (corr.) and when purified by recrystallization from 95% ethyl alcohol melts at 282° (corr.). Ten recrystallizations from various solvents did not change this melting-point appreciably thus indicating the purity of the product.

Analysis shows that the beta compound, as is true of the alpha also, contains only carbon, hydrogen and oxygen but no sulphur or nitrogen. Preliminary studies have given a molecular weight of 294, an iodine number of 86.7 and have shown the presence of three hydroxyl groups.

The relationship between the two compounds is shown in the following table:

|  | Alpha | Beta |
|---|---|---|
| Melting point corr. | 249° | 282° |
| Number of hydroxyls | 2 | 3 |
| Molecular weight | 274 | 294 |
| Iodine number | 93–97 | 85–88 |
| Molecular weight of acetyl derivative | 356 | 410 |
| Probable formula | $C_{18}H_{22}O_2$ | $C_{18}H_{24}O_3$ |

The new products are indicated therapeutically in those disorders characterized by deficient natural hormone secretion. For the practical utilization it is, of course, understood by those skilled in the art, that the crystalline substances can be compounded in the form of suitable dilute aqueous or oily solutions for hypodermic or oral administration. It is possible also to combine the two hormones in the same preparation in predetermined proportions so as to secure the prompt physiological action of the former and the prolonged action of the latter.

Attention is directed to the copending application of Edward A. Doisy, Sidney A. Thayer and Clement D. Veler, Serial No. 432,970, filed March 3, 1930, which discloses and claims an invention relating to products containing the ovarian follicular hormone and processes for obtaining the same.

What I claim as my invention is:

1. The class of compounds having estrogenic activity of the order of 3,000 or more rat units per milligram where one rat unit represents the total amount of hormone necessary to induce estrus with complete cornification in an ovariectomized sexually mature rat weighing approximately 140 grams, said compounds being crystalline substances of the group consisting of the compound $C_{18}H_{24}O_3$ having a melting point of 282° C., the acetyl derivative thereof, and the acetyl derivative of a compound melting at 249° C. and having formula $C_{18}H_{22}O_2$.

2. The class of pure crystalline compounds, each containing at least eighteen carbon atoms and having estrogenic activity of the order of 3,000 or more rat units per milligram where one rat unit represents the total amount of hormone necessary to induce estrus with complete cornification in an ovariectomized sexually mature rat weighing approximately 140 grams, said class consisting of the compound $C_{18}H_{24}O_3$ having a melting point at 282° C., the compound $C_{18}H_{22}O_2$ having a melting point of 249° C. and the acylated derivatives of said compounds.

3. The compound $C_{18}H_{24}O_3$ having a melting point of approximately 282° C. and having high estrogenic activity.

4. A therapeutic product comprising a white crystalline solid having the physiological property of promoting the growth of the uterus, vagina and mammary glands and having the following chemical characteristics, melting point approximately 282° C., formula $C_{18}H_{24}O_3$, number of alcoholic hydroxyl groups capable of acylation 3, molecular weight 294, iodine number 85 to 88.

5. In the process of separating and obtaining two ovarian hormones from extracts containing the same, the steps of fractionally distributing a solution containing both of said hormones between an aqueous alkaline solution and a water immiscible organic solvent of the class comprising sulphuric ether, petroleum ether, benzol, chloroform and butyl alcohol and acidifying the aqueous alkaline solution to obtain a precipitate containing the beta hormone.

6. In the process of separating and obtaining two ovarian hormones from extracts containing the same, the steps of fractionally distributing a solution containing both of said hormones between an aqueous alkaline solution and a water immiscible organic solvent, treating said organic solvent fraction to remove said solvent and form a residue, fractionally distributing said residue between an aqueous alkaline solution and a water immiscible organic solvent, treating the last mentioned organic solvent fraction to remove said solvent therefrom and obtain a residue, recrystallizing said last mentioned residue to obtain the alpha hormone, acidifying one or more of the aqueous alkaline solutions aforesaid, thereby obtaining a precipitate and recrystallizing said precipitate to obtain the beta hormone.

7. In the process of separating and obtaining two ovarian hormones from extracts containing the same, the steps of fractionally distributing a solution containing both of said hormones between an aqueous alkaline solution and a water immiscible organic solvent of the class comprising sulphuric ether, petroleum ether, benzol, chloroform and butyl alcohol, treating said organic solvent fraction to remove said solvent and form a residue, fractionally distributing said residue between an aqueous alkaline solution and a water immiscible organic solvent of the class aforesaid, treating the last mentioned organic solvent fraction to remove said solvent therefrom and obtain a residue, recrystallizing said last mentioned residue to obtain the alpha hormone, acidifying one or more of the aqueous alkaline solutions aforesaid, thereby obtaining a precipitate and recrystallizing said precipitate to obtain the beta hormone.

8. In the process of separating and obtaining two ovarian hormones from extracts containing the same, the steps of fractionally distributing a solution containing both of said hormones between an aqueous alkaline solution and sulphuric ether, and acidifying the aqueous alkaline solution to obtain a precipitate containing the beta hormone.

9. The process of obtaining ovarian hormones comprising extracting urine of pregnant animals with butyl alcohol, removing the butyl alcohol, extracting the residue with benzol, removing the benzol, dissolving the residue in aqueous sodium hydroxide, treating said aqueous sodium hydroxide solution with sulphuric ether thereby fractionally distributing the hormones between the aqueous alkaline solution and the ether solution, removing the ether from said ether solution, dissolving the residue in aqueous sodium hydroxide solution, fractionally distributing the hormones therein between ether and aqueous sodium hydroxide solution, evaporating the ether from the ether solution, recrystallizing the residue therefrom to obtain the alpha hormone and acidifying one or more of the aqueous alkaline solutions from the fractional distribution to precipitate the beta hormone.

10. In the process of separating and obtaining two ovarian hormones from extracts containing the same, the steps of fractionally distributing a solution containing both of said hormones between an aqueous alkaline solution and a water immiscible organic solvent non-reactive to said hormones and acidifying the aqueous alkaline solution to obtain a precipitate containing the beta hormone.

EDWARD A. DOISY.